(12) United States Patent
Herz et al.

(10) Patent No.: US 8,340,635 B2
(45) Date of Patent: Dec. 25, 2012

(54) CAPABILITY MODEL FOR MOBILE DEVICES

(75) Inventors: Scott Herz, San Jose, CA (US); Nitin Ganatra, San Jose, CA (US)

(73) Assignee: Apple Inc., Cupertino, CA (US)

( * ) Notice: Subject to any disclaimer, the term of this patent is extended or adjusted under 35 U.S.C. 154(b) by 476 days.

(21) Appl. No.: 12/567,675

(22) Filed: Sep. 25, 2009

(65) Prior Publication Data

US 2010/0233996 A1 Sep. 16, 2010

Related U.S. Application Data

(60) Provisional application No. 61/160,668, filed on Mar. 16, 2009.

(51) Int. Cl.
*H04M 1/68* (2006.01)
(52) U.S. Cl. ............ 455/411; 455/414.1; 455/419; 455/420; 455/556.1; 455/566; 717/164; 717/168; 717/174; 709/217; 709/219; 709/231
(58) Field of Classification Search ............ 455/411, 455/414.1, 419, 420, 556.1, 566; 717/164, 717/168, 174; 709/217, 219, 231
See application file for complete search history.

(56) References Cited

U.S. PATENT DOCUMENTS

| | | | |
|---|---|---|---|
| 6,469,742 B1 * | 10/2002 | Trovato et al. | 348/553 |
| 6,559,773 B1 | 5/2003 | Berry | |
| 7,013,149 B2 | 3/2006 | Vetro et al. | |
| 7,240,836 B2 | 7/2007 | Vrotsos et al. | |
| 7,412,232 B2 * | 8/2008 | Wilson et al. | 455/418 |
| 7,536,718 B2 * | 5/2009 | Wilson et al. | 726/13 |
| 7,818,734 B2 * | 10/2010 | Giannini et al. | 717/168 |
| 2002/0065872 A1 | 5/2002 | Genske et al. | |
| 2002/0124065 A1 | 9/2002 | Barritt et al. | |
| 2004/0153373 A1 | 8/2004 | Song et al. | |
| 2005/0114493 A1 | 5/2005 | Mandato et al. | |
| 2006/0291483 A1 | 12/2006 | Sela | |
| 2008/0250323 A1 | 10/2008 | Huff | |
| 2008/0254780 A1 | 10/2008 | Kuhl et al. | |
| 2009/0066541 A1 | 3/2009 | Ma et al. | |
| 2009/0089775 A1 * | 4/2009 | Zusman | 717/173 |
| 2010/0205436 A1 * | 8/2010 | Pezeshki | 713/168 |
| 2011/0191859 A1 * | 8/2011 | Naslund et al. | 726/27 |

FOREIGN PATENT DOCUMENTS

WO WO2009010632 1/2009

OTHER PUBLICATIONS

U.S. Appl. No. 61/160,668, filed Mar. 16, 2009, Ganatra, et al.

* cited by examiner

*Primary Examiner* — Amancio Gonzalez
(74) *Attorney, Agent, or Firm* — Fish & Richardson P.C.

(57) ABSTRACT

A server receives an application update request from a mobile device. The request can include a specification of the mobile device and a license. The server can identify an available hardware component of the mobile device based on the specification. The server can identify an access privilege of the hardware component based on the license. The server can further identify an application that utilizes the available hardware component of the mobile device and is accessible under the identified access privilege. The server can recommend the application in response to the application update request.

27 Claims, 9 Drawing Sheets

CAPABILITY MODEL FOR MOBILE DEVICES

CROSS-REFERENCE TO RELATED APPLICATIONS

This application claims priority to pending U.S. Provisional Application Ser. No. 61/160,668, filed Mar. 16, 2009, the entire contents of which are hereby incorporated by reference.

BACKGROUND

This disclosure relates to downloading applications to a mobile device.

Modern mobile devices can provide a number of services, including telephony services, short messaging service (SMS), media-player services, image/video services and e-mail communication. The services are provided by both the software and the hardware of such devices. The services on a mobile device can be expanded by downloading software to the mobile device and by connecting hardware components to the mobile device. Conventionally, downloading software onto a mobile device is not tailored according to the hardware components of the mobile device.

SUMMARY

In some implementations, a server receives an application update request from a mobile device. The request can include a specification of the mobile device and a license. The server can identify an available hardware component of the mobile device based on the specification. The server can identify an access privilege of the hardware component based on the license. The server can further identify an application that utilizes the available hardware component of the mobile device and is accessible under the identified access privilege. The server can recommend the application in response to the application update request.

Particular embodiments of the subject matter described in this specification can be implemented to realize one or more of the following advantages. One advantage of the techniques described in this specification is the ability to recommend more relevant application programs to a user. Another advantage of the techniques is that a mobile device user can avoid downloading applications that are not compatible with the user's mobile device. Another advantage of the techniques is that downloading application programs requires less bandwidth, because incompatible applications are not downloaded. Another advantage of the techniques is that a software developer for mobile applications can avoid writing different application programs for each model of mobile devices. Instead, a developer can write applications according to an API, and link in libraries that are compatible with various components. Another advantage of the techniques is the ease of maintenance of the applications, because once new hardware components (e.g., accessories) become available, only the application libraries, not the applications themselves, need to be updated.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference symbols in the various drawings indicate like elements.

DETAILED DESCRIPTION

Capability Model Overview

Figure 1:
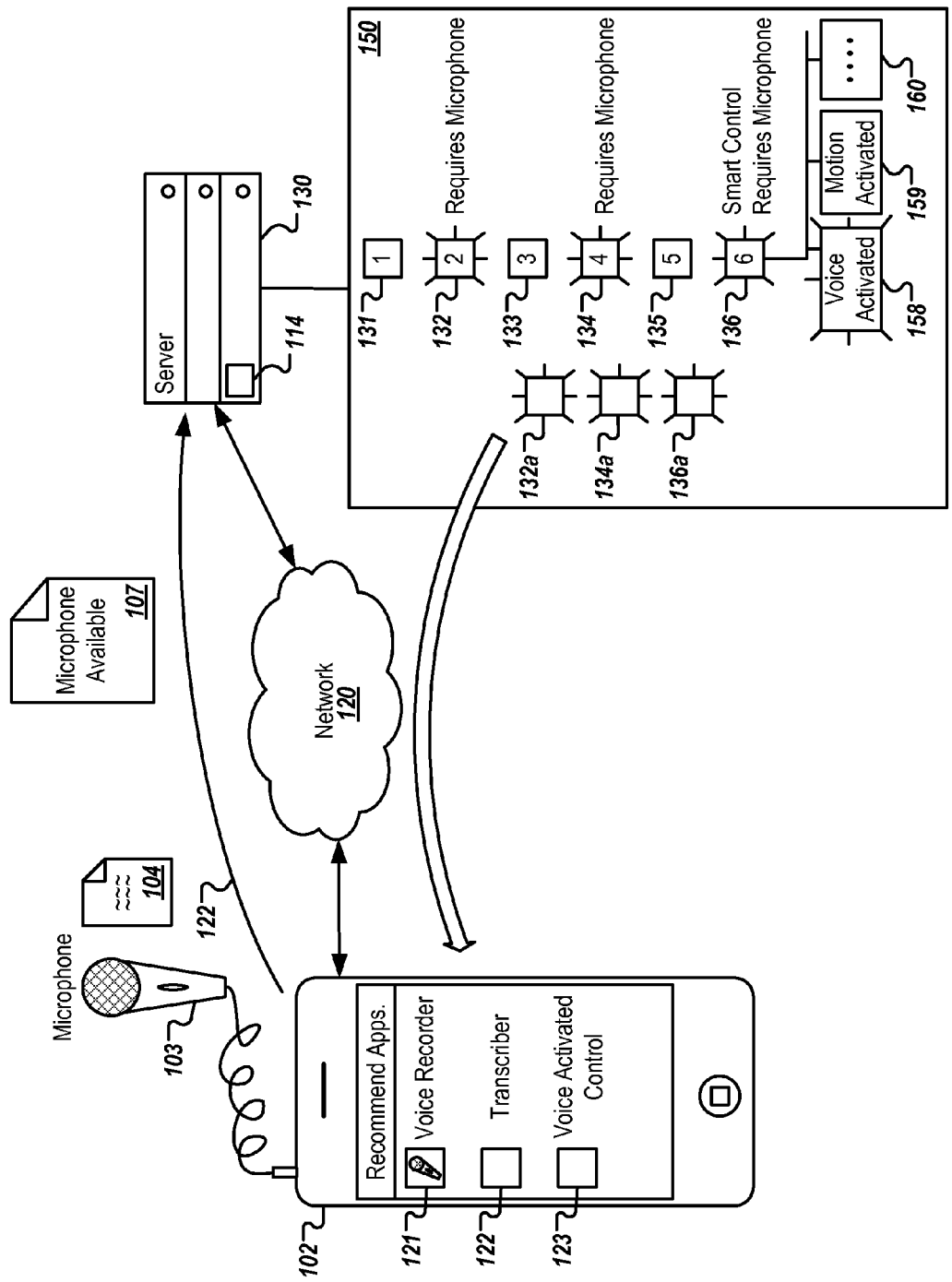
FIG. 1 is an overview of an exemplary capability model for mobile devices.

FIG. 1 is an overview of an exemplary capability model for mobile devices. At a high level, a user of mobile device 102 can download application programs from one or more application servers through a network 120. The terms "application," "application program," and "program" are used interchangeably in this specification, and refer to a set of software instructions that, when executed by a processor, can perform one or more operations. To download an application program, a user can execute an application update function on mobile device 102. The application update function can send update request 122 to application server 130, which can store one or more application programs. In response, application server 130 provides a catalogue for a collection of application programs to mobile device 102 (e.g., "25 most popular downloads"). A user can select one or more application programs from the catalogue and download the selected application program.

Update request 122 can include specification 107 of mobile device 102. The specification of mobile device 102 can include information on the capability of mobile device 102 (e.g., whether mobile device 102 has a built-in camera, a built-in microphone, or a built in Global Positioning System (GPS) receiver). The capability of mobile device 102 can be determined by the hardware components of mobile device 102 and a software stack, which will be described in detail in reference to FIG. 2A.

The specification in the update request can also include information on available hardware components. The term hardware component refers to a hardware device that is built into a mobile device or connected to a mobile device. The term hardware accessory refers to a hardware component that is connected to a mobile device. An available hardware component refers to a functional hardware device that is built into the mobile that has not been disabled (e.g., a built-in loudspeaker, when the mobile device's "silent" mode is turned off), or a functional hardware accessory that is currently connected to the mobile device (e.g., an external microphone that has been switched on). A software program, including a system program or an application program, can communicate with an available hardware accessory through an accessory attachment protocol, which is described in U.S. Provisional Patent Application No. 61/160,644, which is incorporated herein by reference.

For example, a mobile device can have a built-in microphone that is a hardware component. An external microphone that can be plugged into the mobile device is a hardware accessory. A functional external microphone that is plugged into the mobile device is an available hardware accessory of the mobile device. In FIG. 1, mobile device 102 lacks a built-in microphone. External microphone 103 can be plugged into mobile device 102. External microphone 103 can thus become an available hardware accessory. The update request 122 sent from mobile device 102 to server 130 through network 120 can include specification 107, which specifies that external microphone 103 is available on mobile device 102.

Update request 122 can also include information on a license of an available hardware component. A license can be a software key that is built into a firmware of a hardware component. Licenses can be granted by a mobile device manufacturer or mobile device service provider to allow a hardware component to access proprietary applications or functions. For example, a particular make and model of a mobile device can contain a license that allows the device to access premium content. For another example, an enterprise teleconferencing application developer can specify in the teleconferencing application that only licensed teleconferencing accessories (e.g., microphones and video cameras) can access the developer's application programs. Therefore, a hardware component that includes a combination of a microphone and a camera that has a built-in license can run the enterprise teleconferencing application. A hardware components having the same hardware functionality but lacking a license can be prohibited from running the same teleconferencing application. A license can be read by a polling program, or other software programs on the mobile device.

In FIG. 1, external microphone 103 can include built-in license 104. Mobile device 102 can read license 104 when the external microphone 103 is connected to mobile device 102, or when a user executes an application download function. The update request 122 thus includes license 104.

Server 130 can receive update request 122 from mobile device 102. Upon receiving update request 122, server 130 can identify a collection of application programs 132, 134, and 136 from a repository 150 of application programs. References 132a, 134a, and 136a to the identified collection of applications can be created and sent to mobile device 102. Repository 150 of application programs can be a space of application programs for various types and models of mobile devices that have a variety of functionalities and hardware. In some implementations, identifying the collection of application programs from a repository 150 can be based on a category that a user specifies in application request 122 (e.g., "games" or "productivity"), based on the popularity of the application programs (e.g., "top 25 most popular downloads"), or based on a user search query (e.g., "dictionary").

Identifying a collection of application programs can further be based on specification 107 and license 104 of mobile device 102. A mapping engine 114 on server 130 can identify a collection of application programs from a repository 150 of application programs based on specification 107 and license 104 of mobile device 102. The identified collection contains programs that are compatible with the hardware of mobile device 102, i.e., programs that do not require a hardware component that mobile device 102 does not have. Further, the programs in the identified collection can run under license 104.

For example, repository of application programs 150 can include application programs 131, 132, 133, 134, 135, and 136. Among these, application programs 132, 134, and 136 are identified because application programs 132, 134, and 136 can run on a mobile device 102 that has a built-in microphone or has been connected to external microphone 103. Application programs 131, 133, and 135 are not identified because application programs 131, 133, and 135 are either not compatible with the specification of mobile device 102 or cannot run under license 104. For example, application programs 131, 133, and 135 can require a digital camera component, which mobile device 102 does not have.

The mapping engine 114 can use libraries that are linked to an application program to determine whether an application program is compatible with the hardware configurations of mobile device 102. A library can require certain hardware component to be present to function. For example, a library containing functions that accept the motion of mobile device 102 as input can require mobile device 102 to have a motion sensing component (e.g., an accelerometer). An audio toolbox library can require mobile device 102 to have a microphone and a speaker. An application program can run on a specific mobile device if all the hardware requirements in all the libraries that are linked into the application program are satisfied.

Example application program 136 is a program that allows a user to control some functions of mobile device 102 (e.g., for adjusting volume, brightness, touch screen sensitivity, etc.) by motion (e.g., by waving mobile device 102) or voice (e.g., by talking to mobile device 102). Application program 136 can be linked to example libraries 158, 159, and 160. Library 158 contains voice-activated functions and requires a microphone. Library 159 contains motion-activated functions and requires a motion sensor. Library 160 contains touch-screen input functions and requires a touch-sensitive display screen.

Example mobile device 102 has a built-in motion sensor and a touch-sensitive display screen, but no built-in microphone. However, because mobile device 102 is connected to external microphone 103, mobile device 102 satisfies all the hardware requirements of application program 136. Therefore, application program 136 can be recommended to the user in response to update request 122. Similarly, server 130 can recommend program 132 and 134 to the user.

Recommending application programs to a user can include displaying a ranked list of references to the application programs on a display device of a mobile device. For example, server 130 recommends application programs 132, 134, and 136 to the user. On the display device of mobile device 102, three icons 121, 122, and 123 are shown. Icons 121, 122, and 123 correspond to references 132a, 134a, and 136a to application programs 132, 134, and 136, respectively. Icons 121, 122, and 123 can each be shown in conjunction with a brief description next to the icon.

In some implementations, the rank of icons 121, 122, 123 can be initially based on the popularity of each of applications 132, 134, and 136 (e.g., the number of downloads of applications 132, 134, and 136). In addition, server 130 can adjust the rank of each icon based the relevance between applications 132, 134, and 136 and update request 122. For example, server 130 can determine that, because the user has connected external microphone 103 to mobile device 102, the user is likely to be more interested in applications that have voice-activated or voice-related functions. Therefore, the server can list icons 121, 122, and 123 that refer to the three voice applications 132 (e.g., voice recorder), 134 (e.g., transcriber), and 136 (e.g., voice activated control) ahead of other application programs on the screen of mobile device 102, even when applications 132, 134, and 136 are less popular than the other application programs.

The components in FIG. 1, including mobile device 102, application programs 131-137, hardware component 103, hardware component license 104, update request 122, and server 130 are described in further details below.

Referring to mobile device 102 in FIG. 1, mobile device 102 can be a computing device that includes a processor, a storage device, one or more built-in capabilities, a user interface, and a hardware interface through which hardware accessories can be connected. In some implementations, mobile device 102 also includes various hardware components such as loudspeakers, a display screen, a motion sensor, etc. Details on mobile device 102 will be described below, in reference to FIGS. 2A and 2B.

Mobile device 102 can store and execute one or more application programs. An application program can be downloaded to mobile device 102, updated when new versions of the application program becomes available, executed by mobile device 102 when proper license requirements are satisfied, disabled when licenses expire, or deleted upon user request.

Referring to application programs 131-136 in FIG. 1, an application program can be downloaded directly to mobile device 102 or downloaded to another computing device and synchronized to mobile device 102. In a direct download, mobile device 102 can send update request 122 to sever 130. In response, server 130 can send a list of recommendations to mobile device 102. The recommendations can be references to application programs. A user can browse through the recommended application programs, and select one or more application programs to download. For example, a user can tap an icon "Application Store" on mobile device 102. Mobile device 102 can display a list of application programs, based on a user selection criteria (e.g., most downloaded, by category, or by user search term). A user can select an application from the list and tap on the icon that refers to the application. In response, the selected application can be transmitted from server 130 to mobile device 102 through network 120.

Updating an application program can be triggered by a user request, by an event such as adding a hardware component or acquiring a license, or by a software update on a server. For example, a computer program "Application Store" can run on a desktop computer that is connected to server 130 through network 120. A user can browse, select, and download application programs using the desktop computer. After downloading an application program, a user can connect mobile device 102 with the desktop computer (e.g., using a USB cable), and synchronize mobile device 102 and the desktop computer. The downloaded application program can be transferred to mobile device 102 during synchronization.

Referring to hardware component 103 (microphone) in FIG. 1, a hardware component of a mobile device can be an external hardware device that can be connected to the mobile device. A hardware component is available if the hardware component is not turned off (e.g., when a lens cover of a digital camera component is removed), or if the hardware component is properly connected to the mobile device (e.g., when a microphone is plugged into the mobile device). In some implementations, a mobile device can detect available components by consulting a local hardware stack or by running a software polling program that polls connection ports. A connection port can be, for example, a socket, a Universal Serial Bus (USB) port, or a Personal Area Network (PAN) to which the mobile device is connected using Bluetooth technology. In some other implementations, a mobile device can detect available hardware components by running a hardware detection program that is triggered by the physical insertion of a hardware device.

A hardware component can be a smart hardware component. A smart hardware component can notify the mobile device whether the hardware component is available. In some implementations, a built-in hardware device can be programmatically activated or deactivated. For example, a mobile device 102 can have a "do not disturb" function that specifies at which time a loud speaker is available. During the "do not disturb" time, the loud speaker appears unavailable even though the loud speaker is built into mobile device 102.

In some implementations, a smart hardware component, upon being plugged into a mobile device, can provide a signature of the component and specification of the component to the mobile device in response to the polling program on the mobile device or the program that is triggered by the physical insertion. For example, a hardware detection program on a mobile device 102 can be activated in response to the physical inserting of a connector of a smart microphone 103. The hardware detection program can make requests to smart microphone 103 in order to determine the model and other specifications of microphone 103. Smart microphone 103 can contain built in firmware that can respond to the request, and let the mobile device know the model, type (e.g., dynamic, ribbon, piezoelectric, etc.), and specification which can include a polar pattern (e.g., omnidirectional, unidirectional, shotgun, etc.) and a range of frequency response. Such information can be passed in specification 107 in an update request to server 130. Server 130 can use such information to determine which application program to recommend. For example, server 130 can recommend a teleconferencing application program when external microphone 103 has an omnidirectional polar pattern, and recommend a studio sound recording and editing application program when external microphone 103 has a shotgun polar pattern.

In some implementations, license 104 can be a public key which, when decrypted by a corresponding private key, authenticates the hardware component and determines the access privileges of the hardware component. License 104 can be used to distinguish a licensed hardware component from a generic hardware component. In some implementations, license 104 can be used by mobile device 102 to enable a licensed hardware component and disable an unlicensed hardware component. In some implementations, license 104 can be used to certify that the hardware component complies with certain specifications (e.g., a plugged-in or built-in microphone that has sufficient range of frequency response). Complying with certain specifications can enable the hardware component to execute certain application programs. For example, license 104 can certify that microphone 103 is suitable for musical recordings. License 104 can be used by server 130 to determine that a musical recording application program can be recommended to mobile device 102 connected to microphone 103.

In some other implementations, license 104 can be used to determine what application programs a particular hardware component, or a category of components, can access. An application program developer can require certain hardware components to be used in association with an application program. For example, a developer can write a program that can be downloaded to mobile device 102 and can make mobile device 102 into a smart multimeter if a sensor is connected to mobile device 102. The developer can specify that only a licensed sensor can function with the application program.

In some implementation, license 104 can be built into the firmware of a hardware component. Mobile device 102 can determine if an built-in component has a license by consulting an operating system of the mobile device. Mobile device 102 can determine if an external hardware accessory has a license by inquiring into the firmware of the external hardware accessory.

The update request 122 can be a software request sent from mobile device 102 through network 120 to server 130 demanding that a system software program, an application program, or an update on an existing application program be downloaded on mobile device 102. In addition to being sent from mobile device 102, an update request can also be sent from another computing device, which can be synchronized with mobile device 102.

Update request 122 can be triggered by a user in various ways. For example, mobile device 102 can display an icon (e.g., "Application Store") on a display device. The icon can be linked to a system routine. Upon a user's tapping on the icon, the system routine can be activated to send update request 122 to server 130.

Update request 122 can include a mobile device's identity (e.g., network address). Update request 122 can also include the mobile device's specification 107. In some implementations, the specification can include information on the built-in hardware components of the mobile device (e.g., whether the mobile device has a built-in digital camera). In some implementations, the specifications can include the model and type of mobile device 102 (e.g., an iPhone™ or an iPod™). Server 130 can use the model and type information to determine the capabilities of mobile device 102. The information on built-in hardware components and model and type can be cached on server 130 in association with the identity of mobile device 102. Caching the specification of mobile device 102 on server 130 can reduce network traffic when application programs on mobile device 102 is updated, because the specification need not be transmitted through network 120 each time an update occurs. The cache can be refreshed periodically (e.g., upon rebooting mobile device 102).

Update request 122 can also include specifications that contain information on the available hardware components of mobile device 102. The information on the available hardware components can include information that has been built into operating system of mobile device 102 or the firmware of a smart hardware accessory and retrieved to mobile device 102. An update request can further include license 104 on the hardware components. In some implementations, the information on the available hardware components of mobile device 102 and license 104 can be sent from mobile device 102 to server 130 each time an update request is made. In some implementations, the hardware component information can be cached on server 130 in association with the identity of mobile device 102. The cached information can be updated when an additional hardware accessory is connected to mobile device 102 or when the available hardware accessory is disconnected from mobile device 102.

Server 130 can include one or more processors and one or more storage devices. One or more application programs 131-136 can be stored on the storage devices of server 130. Each of application programs 131-136 can be compatible with a specific type of mobile device, or a specific capability of a mobile device. For example, a telephone application program can be compatible with mobile devices that are mobile telephones. A location-based restaurant guide application program can be compatible with mobile devices that have built-in positioning devices (e.g., GPS receivers).

Storage devices on server 130 can store software libraries 158, 159, and 160 in addition to application programs. Various software libraries can be linked into application programs. Software libraries can be hardware specific. A library can require a specific hardware component be present for the library to function. Using software libraries that are hardware specific can permit a developer to write one set of source code to build applications that are tailored to more than one type of mobile device. In some implementations, a developer can specify which software libraries are linked into an application program. For example, a developer can write source code for a music player. The developer can link the source code to a standard media player library to create an application that maximizes performance on a mobile device that has large amount of memory and standard audio hardware components. Without having to rewrite the source code, the developer can link the same source code to a simplified media library to create another application that minimizes memory usage on a mobile device that has small amount of memory and basic audio hardware components. In some implementations, a server 130 can dynamically determine which library can be linked at time an update request is received, based on the capability information and the license information that are included in the update request.

Application developers can upload application programs into repository 150 of application programs on server 130. An application developer can upload an application program and specify that certain access privileges be required in order to download or execute the application. An application developer can specify whether an application program can be downloaded for free, whether an application program can be downloaded for a fee, whether an application program is available to a limited group of users, and whether the application program requires a licensed hardware component to run. In some implementations, access privilege can permit one or more applications to be executed on the mobile device after the hardware accessory is connected to the mobile device.

In some implementations, the license in a hardware component determines the access privilege of the hardware component. Application server 130 can enforce the access privileges requirements specified by a developer by identifying a license in an update request and determining the access privilege based on the license. For example, if application program 135 is an enterprise teleconferencing program that requires an enterprise access privilege, mobile devices that are connected to accessories that contain a specific license that grants the mobile devices such enterprise access privileges can access application program 135. Server 130 will recommend application program 135 to a user when the user's mobile device has a built-in hardware device or is connected to a hardware accessory that contains the specific license.

In some implementations, server 130 can include mapping engine 114 that can identify application programs based on hardware capability and a license. Mapping engine 114 can map the capabilities and licenses of a mobile device with compatible application programs in repository 150. In some implementations, mapping engine 114 stores the license and hardware requirements of application programs in one or more license tables and library requirement tables. When server 130 receives an update request that includes specification and license information of a mobile device and the mobile device's hardware components, mapping engine 114 can use the received specification and license information to identify compatible application programs.

To determine whether an application program is compatible with a mobile device that has a particular hardware component, server 130 can take into consideration the inheritance relationships between various hardware components. The specification information on a hardware component can be general (e.g., "microphone") or specific (e.g., "omnidirectional microphone with frequency response range between 50 Hz and 3,000 Hz"). A specific hardware component has an "is a" relationship with a general hardware component in the same category (e.g., an "omnidirectional microphone with frequency response range between 50 Hz and 3,000 Hz" is a "microphone"). An application program that requires a general hardware component is compatible with a mobile device that is connected to a specific accessory that is in the same category of hardware accessories. For example, an application program that requires a mobile device to have a "microphone" component can run on a mobile device that is connected to an "omnidirectional microphone with frequency response range between 50 Hz and 3,000 Hz." However, the reverse is not necessarily true. For example, an application program that is compatible with a mobile device that has an "omnidirectional microphone with frequency response range between 50 Hz and 3,000 Hz" is not necessarily compatible with a mobile device that has a generic built-in microphone.

Similar to specification information, a license on a hardware component can also be general (e.g., licensed "for teleconferencing") or specific (e.g., licensed for "teleconferencing with video"). An application program that requires a general license can run on a mobile device that has a hardware component that has a specific license. For example, an application program that can run on a mobile device that has a license "for teleconferencing" can run on a mobile device that has a license for "teleconferencing with video." However, the reverse is not necessarily true. For example, an application program that can run only on a mobile device that has a license "for teleconferencing with video" does not necessarily run on a mobile device that has a license "for teleconferencing."

The license and hardware requirements of application programs in one or more license tables and specification tables can be entered by developers who built the application programs or developers who built the application libraries when the developers upload the application programs to server 130. The license and hardware requirements of application programs in one or more license tables and specification tables can also be determined by server 130, based on the software library a developer uses. For example, if a developer links in a library that contains microphone specific functions, mapping engine can add "microphone" as a required built-in device or hardware accessory.

Exemplary Mobile Device

Figure 2A:
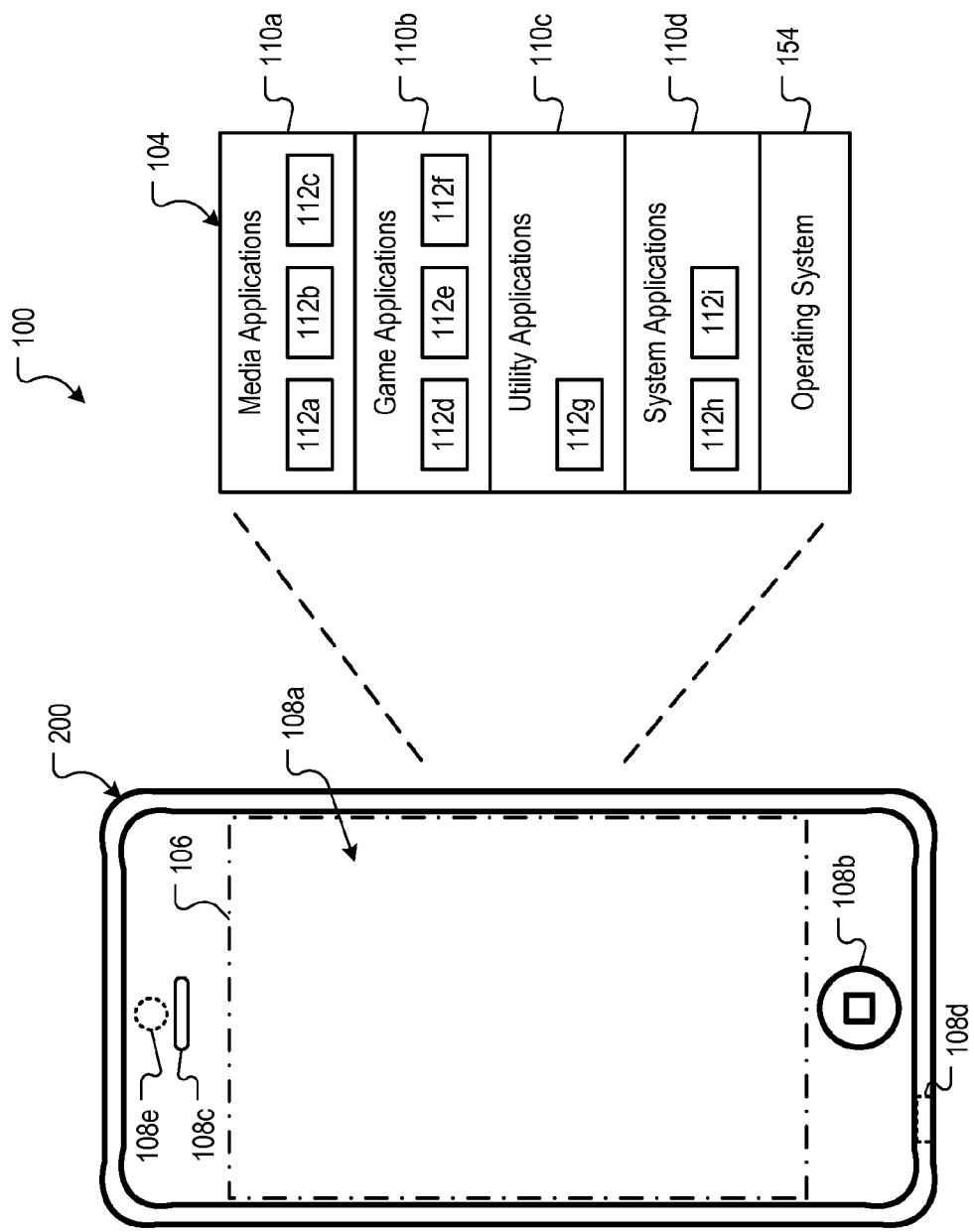
FIG. 2A is a block diagram of an exemplary mobile device on which a collection of application programs are stored.

FIG. 2A is a block diagram of an exemplary mobile device 200 on which a collection of application programs are stored. At a high level, mobile device system 100 can, in some implementations, include mobile device 200 and software stack 104. Software stack 104 can be stored in a memory or on a storage device of mobile device 200. Mobile device 200 can include Graphical User Interface (GUI) 106 and one or more hardware components 108a-e. Software stack 104 can include different categories 110a-d of applications 112a-i, and operating system 154. System application 112h can determine or otherwise identify a model/type of mobile device 200 in response to any suitable event (e.g., initialization, activation). Mapping engine 114 can use the model/type of the mobile device to identify hardware capabilities of mobile device 200 based on a standard product feature of the model/type of the mobile device. The standard hardware capabilities can include, for example, hardware components 108a-e, resolution of a built-in digital camera, precision of a built-in GPS receiver, capacity of a built-in storage device, etc.

Mobile device 200 can include any software, hardware, and/or firmware configured to execute one or more applications 112a-i. Mobile device 200 can be, for example, a hand-held computer, a personal digital assistant (PDA), a cellular telephone, a network appliance, a camera, a smart phone, an enhanced general packet radio service (EGPRS) mobile phone, a network base station, a media player, a navigation device, an email device, a game console, or a combination of any two or more of these data processing devices and/or other data processing devices. Mobile device 200 can be a media player, an email device, and a navigation device operable to wirelessly connect with an external or unsecured network. In another example, mobile device 200 can include a laptop that includes an input device, such as a keypad, touch screen or touch surface, one or more scroll wheels, one or more buttons or other device that can accept information, and an output device that conveys information, including digital data, visual information, or GUI 106. Both the input device and output device may include fixed or removable storage media such as a magnetic computer disk, CD-ROM, flash, or other suitable media to both receive input from and provide output to users of mobile devices 102 through the display such as GUI 106.

GUI 106 can include a graphical user interface operable to allow a user of mobile device 200 to interface with at least a portion of system 100 for any suitable purpose, such as using applications 112a-i. Generally, GUI 106 provides the particular user with an efficient and user-friendly presentation of data provided by or communicated within system 100. GUI 106 may include one or more customizable frames or views having interactive fields, pull-down lists, and/or buttons operated by the user. The term graphical user interface may be used in the singular or in the plural to describe one or more graphical user interfaces and each of the displays of a particular graphical user interface. GUI 106 can include any graphical user interface, such as a generic web browser or touch screen that processes information in system 100 and presents the results to the user.

Hardware components 108a-e can provide one or more features and/or functions to the operation of mobile device 200. In the illustrated implementation, the hardware components include display 108a, button 108b, speaker 108c, microphone 108d, and camera 108e. For example, hardware component 108e can be a camera configured to capture images and/or video. These hardware components 108 are for illustration purposes only and mobile device 200 may include all, some, or different hardware components 108 without departing from the scope of this disclosure. In some implementations, the hardware components 108 may include one or more of the following: motion sensors, light sensors, proximity sensors, camera, RF antenna, speakers, microphone, a display (e.g., touch screen), and/or other hardware. In addition, different models of mobile device 200 may have different versions of the hardware components 108. In some implementations, display 108a may be a touch screen for one model and a display for a different model. In some implementations, camera 108e of one model may capture still images while camera 108e of a different model may capture both still images and video (e.g., 30 frames/sec). In some implementations, mobile device 200 may not include some hardware components 108 that other models include. For example, mobile device 200 may not include camera 108e. In short, hardware components 108 may include the same, some, none, or different versions for different models of mobile device 102.

The software stack 104 is loaded in various models of mobile device 200. Software stack 104 can be loaded automatically or manually. In some implementations, in response to at least an event (e.g., initialization, activation), operating system 154 residing in each model automatically identifies the device model/type. For example, the device model may be a string of characters locally stored in each device 200. Operating system 154 can automatically identify one or more applications 112 associated with the device model. For example, operating system 154 running on mobile device 200 can identify application 112*i* configured to manage cellular hardware components 110 for wirelessly communicating call sessions. In some implementations, operating system 154 running on a particular model of mobile device 200 does not identify cellular application 112*i* because this particular model does not include cellular hardware components.

In addition, operating system 154 can identify instructions for identifying one or more properties for each of the identified hardware component 108. For example, operating system 154 for mobile device 200 can identify hardware component 108*d* microphone. Operating system 154 on mobile device 200 can identify different properties for different hardware components 108. For instance, a model of mobile device 200 can include a larger storage component than another model of mobile device 200. As result of this example difference, operating system 154 can configure a property of media player application 112*a* differently for the different models of mobile device 200. In connection with identifying applications 112 and associated properties, operating system 154 can automatically configure applications 112 and associated properties for execution by the different models of mobile device 200. Further, during an application program download process, the device model/type, as well as other information on hardware components, can be sent to server 130. As mentioned above, software stack 104 can, in some implementations, enable the development of a single software stack 104 that can be loaded in one or more different devices and automatically configure one or more of the applications 112 to execute on the different devices.

Figure 2B:
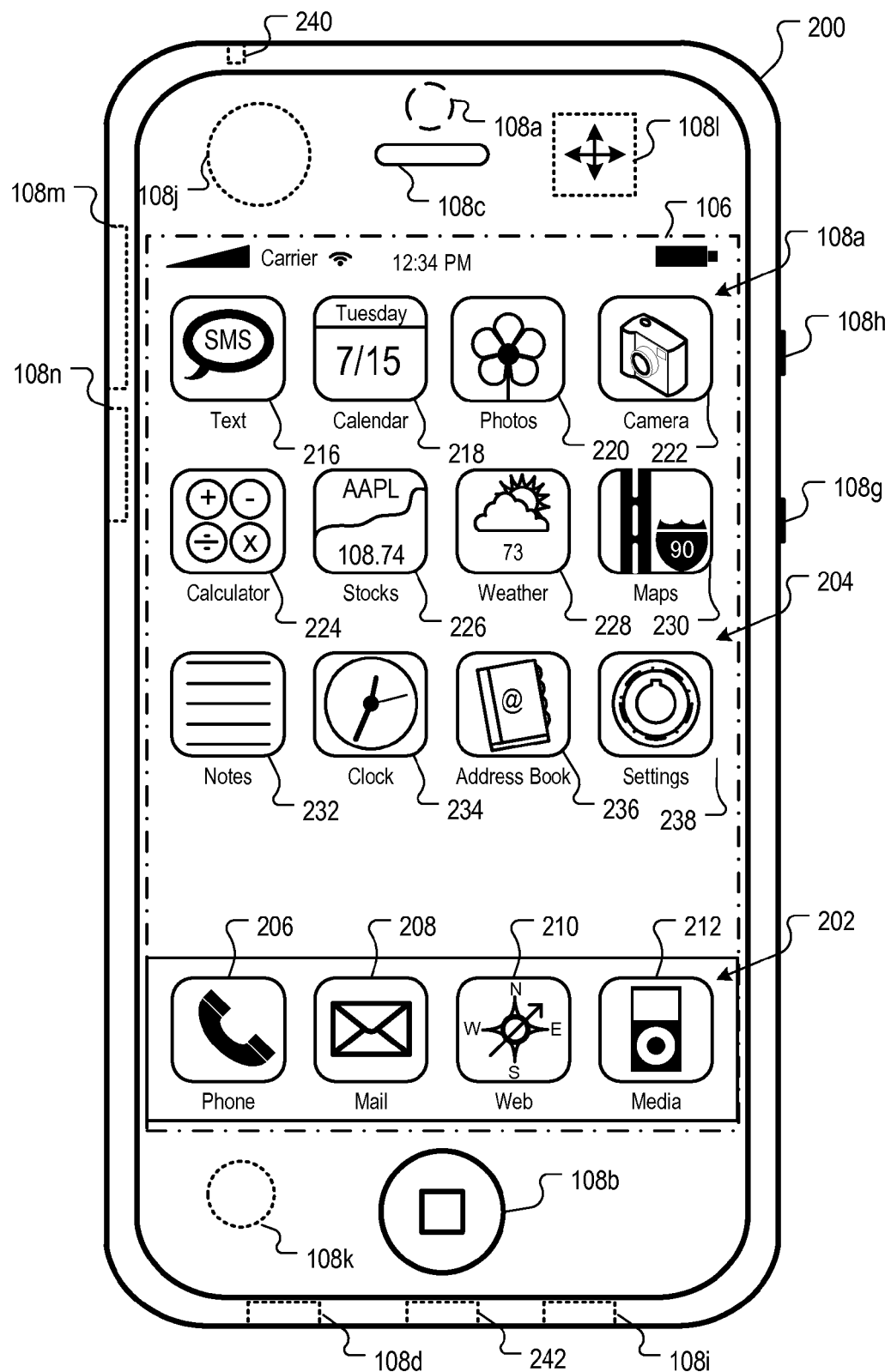
FIG. 2B is a block diagram of an exemplary mobile device that includes multiple hardware and software components.

FIG. 2B is a block diagram of an exemplary mobile devices 200 that includes multiple hardware and software components. An example model of mobile device 200 is shown. In some implementations, mobile device 200 includes touch-sensitive display 108*a*. The touch-sensitive display 108*a* can implement liquid crystal display (LCD) technology, light emitting polymer display (LPD) technology, or some other display technology. The touch sensitive display 108*a* can be sensitive to haptic and/or tactile contact with a user and capable of accepting user input based on the contact.

In some implementations, mobile device 200 can display one or more graphical user interfaces on touch-sensitive display 108*a* for providing the user access to various system objects and application programs and for conveying information to the user. In some implementations, the graphical user interface can include one or more display objects 202, 204. In the example shown, display objects 202 and 204 are graphic representations of system objects and application programs. Some example system objects include device functions, windows, files, alerts, events, or other identifiable system objects. Some example application programs include application programs that are downloaded from an application store on server 130.

In some implementations, mobile device 200 can implement multiple device functionalities, such as a telephony device, as indicated by phone object 206; an e-mail device, as indicated by e-mail object 208; a network data communication device, as indicated by Web object 210; a Wi-Fi base station device (not shown); and a media processing device, as indicated by media player object 212. In some implementations, particular display objects 202, e.g., phone object 206, e-mail object 208, Web object 210, and media player object 212, can be displayed in menu bar 202. In some implementations, device functionalities can be accessed from a top-level graphical user interface, such as the graphical user interface illustrated in FIG. 2B. Touching one of objects 206, 208, 210, or 212 can, for example, invoke corresponding functionality.

In some implementations, upon invocation of device functionality, the graphical user interface of mobile device 200 changes, or is augmented or replaced with another user interface or user interface elements, to facilitate user access to particular functions associated with the corresponding device functionality. For example, in response to a user touching phone object 206, GUI 106 of touch-sensitive display 108*a* can present display objects related to various phone functions; likewise, touching of email object 208 can cause the graphical user interface to present display objects related to various e-mail functions; touching Web object 210 can cause the graphical user interface to present display objects related to various Web-surfing functions; and touching media player object 212 can cause the graphical user interface to present display objects related to various media processing functions.

In some implementations, a graphical user interface environment can be organized into layers. From a top level layer of the graphical user interface, a user can navigate to other levels. The top-level graphical user interface environment or state of FIG. 2B can be restored by pressing button 108*b* located near the bottom of mobile device 200. In some implementations, each corresponding device functionality may have corresponding "home" display objects displayed on touch-sensitive display 108*a*, and the graphical user interface environment of FIG. 2B can be restored by pressing the "home" display object.

In some implementations, the top-level graphical user interface can include additional display objects 204, which can include icons and labels referencing application programs. Some examples of display objects are short messaging service (SMS) object 216, calendar object 218, photos object 220, camera object 222, calculator object 224, stocks object 226, weather object 228, maps object 230, notes object 232, clock object 234, address book object 236, and settings object 238. Touching SMS display object 216 can, for example, invoke an SMS messaging environment and supporting functionality; likewise, each selection of a display object 216, 218, 220, 222, 224, 226, 228, 230, 232, 234, 236 and 238 can invoke a corresponding object environment and functionality.

Additional or different display objects can also be displayed in the graphical user interface of FIG. 2B. For example, if device 200 is functioning as a base station for other devices, one or more "connection" objects may appear in the graphical user interface to indicate the connection. In some implementations, display objects 204 can be configured by a user, e.g., a user may specify which display objects 204 are displayed, and/or may download additional applications or other software that provides other functionalities and corresponding display objects.

In some implementations, mobile device 200 can include one or more input/output (I/O) devices and/or sensor devices. In addition to hardware components 108 illustrated in FIG. 2A, mobile device 200 can include one or more of the following hardware components: In some implementations, up/down button 108g for volume control of speaker 108c and microphone 108d can be included. Mobile device 200 can also include on/off button 108h for a ring indicator of incoming phone calls. In some implementations, loudspeaker 108i can be included to facilitate hands-free voice functionalities, such as speaker phone functions. Audio jack 240 can also be included for use of headphones and/or a microphone.

In some implementations, proximity sensor 108j can be included to facilitate the detection of the user positioning mobile device 200 proximate to the user's ear and, in response, to disengage the touch-sensitive display 108a to prevent accidental function invocations. In some implementations, touch-sensitive display 108a can be turned off to conserve additional power when mobile device 200 is proximate to the user's ear. Other sensors can also be used. For example, in some implementations, an ambient light sensor 108k can be utilized to facilitate adjusting the brightness of touch-sensitive display 108a. In some implementations, an accelerometer 108l can be utilized to detect movement of mobile device 200, as indicated by the directional arrows. Accordingly, display objects and/or media can be presented according to a detected orientation, e.g., portrait or landscape. In some implementations, mobile device 200 may include circuitry and sensors for supporting a location determining capability, such as that provided by the GPS or other positioning systems (e.g., systems using Wi-Fi access points, television signals, cellular grids, Uniform Resource Locators (URLs)). In some implementations, a positioning system (e.g., a GPS receiver) can be integrated into mobile device 200 or provided as a separate device that can be coupled to mobile device 200 through an interface (e.g., port device 242) to provide access to location-based services.

In some implementations, port device 242, e.g., a USB port, or a docking port, or some other wired port connection, can be included. Port device 242 can, for example, be utilized to establish a wired connection to other computing devices, such as other communication devices 200, network access devices, a personal computer, a printer, a display screen, or other processing devices capable of receiving and/or transmitting data. In some implementations, port device 242 allows mobile device 200 to synchronize with a host device using one or more protocols, such as, for example, the TCP/IP, HTTP, UDP and any other known protocol. In some implementations, a TCP/IP over USB protocol can be used.

Mobile device 200 can also include camera lens and sensor 108e (shown in FIG. 2A). In some implementations, camera lens and sensor 108e can be located on the back surface of mobile device 200. The camera can capture still images and/or video.

In some implementations, a model of mobile device 200 does not include several hardware components 108 included in the model illustrated in FIG. 2B. For example, camera 108e and microphone 108d can be absent on a particular model of mobile device 200. In some implementations, the absence of these hardware components 108 enable mobile device 200 to include different components 108 and/or different versions of other hardware components 108. For example, mobile device 200 without a built-in camera or microphone can include larger storage space for files such as audio and/or video files. Based, at least in part, on the differences in the hardware components 108, software stack 104 of FIG. 2A can, in some implementations, be configured differently for the different models.

Exemplary Mobile Device Architecture

Figure 3:
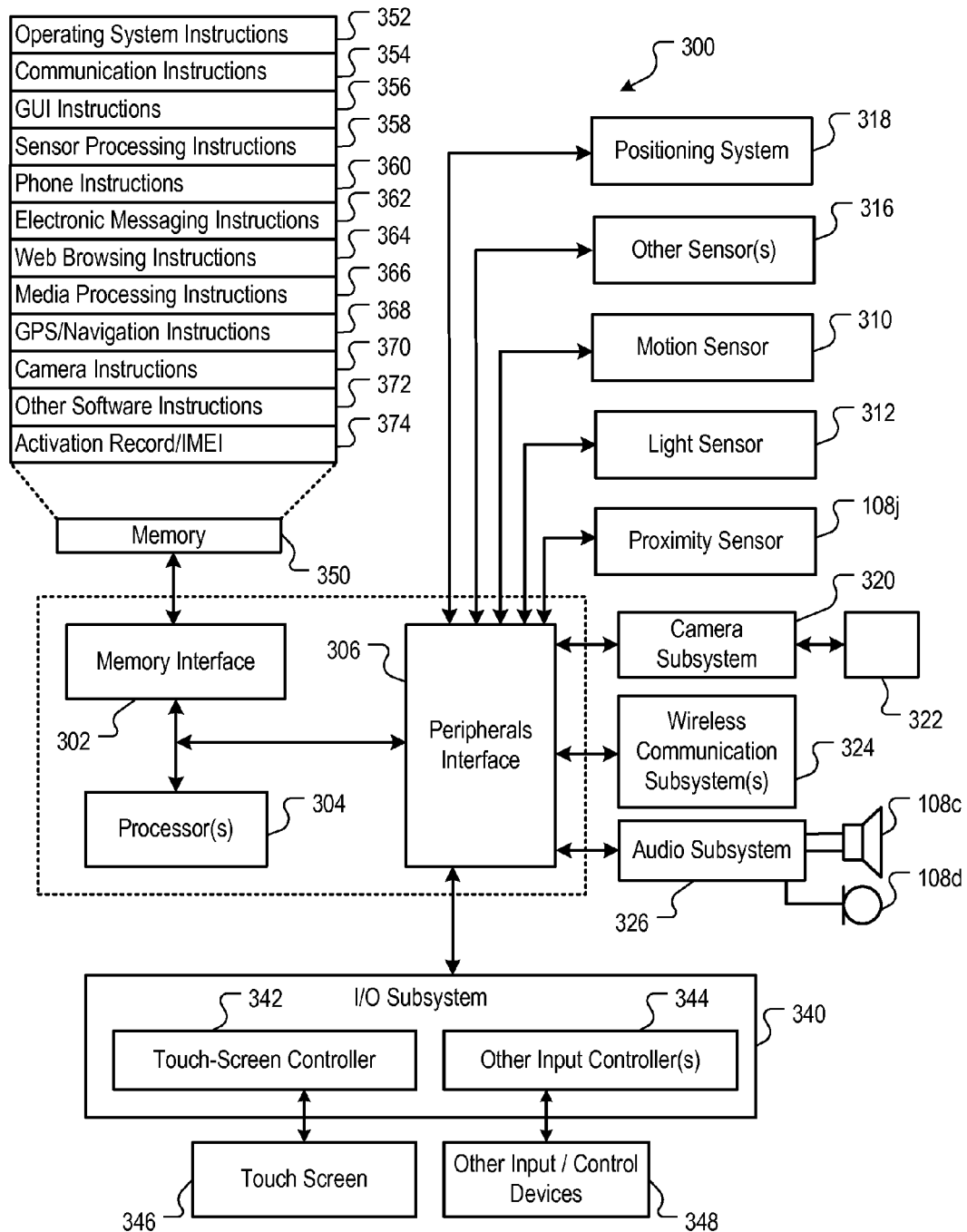
FIG. 3 illustrates an exemplary system architecture of the exemplary mobile device of FIGS. 2A and 2B.

FIG. 3 illustrates an exemplary system architecture 300 of exemplary mobile device 200 of FIGS. 2A and 2B. Mobile device 200 can include a memory interface 302, one or more data processors, image processors and/or central processing units 304, and a peripherals interface 306. Memory interface 302, one or more processors 304 and/or peripherals interface 306 can be separate components or can be integrated in one or more integrated circuits. The various components in mobile device 200 can be coupled by one or more communication buses or signal lines.

Sensors, devices and subsystems can be coupled to peripherals interface 306 to facilitate multiple functionalities. For example, a motion sensor 310, a light sensor 312, and a proximity sensor 108j can be coupled to peripherals interface 306 to facilitate the orientation, lighting and proximity functions. Other sensors 316 can also be connected to peripherals interface 306, such as a temperature sensor, a biometric sensor, or other sensing device, to facilitate related functionalities.

In some implementations, mobile device 200 can receive positioning information from positioning system 318. Positioning system 318, in various implementations, can be built into the mobile device, or can be coupled with the mobile device (e.g., using a wired connection or a wireless connection). In some implementations, positioning system 318 can include a GPS receiver and a positioning engine operable to derive positioning information from received GPS satellite signals. In other implementations, positioning system 318 can include a compass and an accelerometer, as well as a positioning engine operable to derive positioning information based on dead reckoning techniques. In still further implementations, positioning system 318 can use wireless signals (e.g., cellular signals, IEEE 802.11 signals, etc) to determine location information associated with the mobile device, such as those provided by Skyhook Wireless, Inc. of Boston, Mass. Hybrid positioning systems using a combination of satellite and television signals, such as those provided by Rosum Corporation of Mountain View, Calif., can also be used. Other positioning systems are possible.

In some example models of mobile device 200, camera subsystem 320 and optical sensor 322, e.g., a charged coupled device (CCD) or a complementary metal-oxide semiconductor (CMOS) optical sensor, can be utilized to facilitate camera functions, such as recording photographs and video clips. In some other example models of mobile device 200 that do not have camera capability, camera subsystem 320 and optical sensor 322 can be absent.

Communication functions can be facilitated through one or more wireless communication subsystems 324, which can include radio frequency receivers and transmitters and/or optical (e.g., infrared) receivers and transmitters. The specific design and implementation of communication subsystem 324 can depend on the communication network(s) over which mobile device 200 is intended to operate. For example, mobile device 200 can include communication subsystems 324 designed to operate over a GSM network, a GPRS network, an EDGE network, a Wi-Fi or WiMax network, and a Bluetooth™ network. In particular, the wireless communication subsystems 324 may include hosting protocols such that mobile device 200 can be configured as a base station for other wireless devices.

In some example models of mobile device 200 (e.g., cellular telephones), an audio subsystem 326 can be coupled to speaker 108c and microphone 108d to facilitate voice-enabled functions, such as voice recognition, voice replication, digital recording, and telephony functions. In some other example models of mobile device 200 (e.g., GPS navigator devices), audio subsystem 326, speaker 108c, and microphone 108d can be unavailable. A mobile device that lacks audio subsystem 326, speaker 108c, and microphone 108d can execute voice-enabled application programs, such as application programs having voice recognition, voice replication, digital recording, and telephony functions when the mobile device is connected to external microphone 103 and an external speaker.

I/O subsystem 340 can include a touch screen controller 342 and/or other input controller(s) 344. Touch-screen controller 342 can be coupled to touch screen 346. Touch screen 346 and touch screen controller 342 can, for example, detect contact and movement or break thereof using any of one or more touch sensitivity technologies, including but not limited to capacitive, resistive, infrared, and surface acoustic wave technologies, as well as other proximity sensor arrays or other elements for determining one or more points of contact with touch screen 346.

Other input controller(s) 344 can be coupled to other input/control devices 348, such as one or more buttons, rocker switches, thumb-wheel, infrared port, USB port, and/or a pointer device such as a stylus. The one or more buttons (not shown) can include an up/down button for volume control of speaker 108c and/or microphone 108d.

In one implementation, a pressing of the button for a first duration may disengage a lock of touch screen 346; and a pressing of the button for a second duration that is longer than the first duration may turn power to mobile device 200 on or off. The user may be able to customize a functionality of one or more of the buttons. Touch screen 346 can, for example, also be used to implement virtual or soft buttons and/or a keyboard.

In some embodiments, mobile device 200 can present recorded audio and/or video files, such as MP3, AAC, and MPEG files. In some implementations, mobile device 200 can include the functionality of an MP3 player, such as an iPod™. Mobile device 200 can, therefore, include a 36-pin connector that is compatible with the iPod. Other input/output and control devices can also be used.

Memory interface 302 can be coupled to memory 350. Memory 350 can include high-speed random access memory and/or non-volatile memory, such as one or more magnetic disk storage devices, one or more optical storage devices, and/or flash memory. Memory 350 can store operating system 352, such as Darwin, RTXC, LINUX, UNIX, OS X, WINDOWS, or an embedded operating system such as VxWorks. Operating system 352 may include instructions for handling basic system services and for performing hardware dependent tasks. In some implementations, operating system 352 can include a kernel (e.g., UNIX kernel).

Memory 350 can also store communication instructions 354 to facilitate communicating with one or more additional devices, one or more computers and/or one or more servers. Memory 350 may include graphical user interface instructions 356 to facilitate graphic user interface processing; sensor processing instructions 358 to facilitate sensor-related processing and functions; electronic messaging instructions 362 to facilitate electronic-messaging related processes and functions; web browsing instructions 364 to facilitate web browsing-related processes and functions; media processing instructions 366 to facilitate media processing-related processes and functions; GPS/Navigation instructions 368 to facilitate GPS and navigation-related processes and instructions; and/or other software instructions 372 to facilitate other processes and functions.

In mobile devices that have telephone capabilities, memory 350 can also include phone instructions 360 to facilitate phone-related processes and functions and camera instructions 370 to facilitate camera-related processes and functions, which are supported by the hardware components speaker 108c, microphone 108d, and camera 108e. In some implementations, memory 350 of mobile device 200 does not include phone instructions or camera instructions, when mobile device 200 does not have sufficient hardware support (e.g., a microphone or a camera component) for the phone and camera instructions. In some other implementations, memory 350 of mobile device 200 can include the phone instructions or camera instructions, even though when mobile device 200 does not have sufficient hardware support. The phone instructions and camera instructions can be activated when an external hardware accessory that can support the execution of the instructions (e.g., external microphone 103 or an external camera) is connected to mobile device 200.

Memory 350 can also include preferences engine 374. Preferences engine 374 can be operable to receive user preferences as to the sorts of content the user is interested. In some implementations, the preferences can be used to filter the sorts of information that is sent to mobile device 100. For example, the user might indicate a preference for local music. Thus, when local music is available mobile device 100 can retrieve available local music. In another example, the user might indicate a preference not to receive video, route or image content when in a specified area (e.g., hometown, familiar city, etc.), but to receive route and image content when outside of their specified area. These preferences can be communicated to a media service, and can be used by the media service to provide relevant media content based on location and/or preferences.

Each of the above identified instructions and applications can correspond to a set of instructions for performing one or more functions described above. These instructions need not be implemented as separate software programs, procedures or modules. Memory 350 can include additional instructions or fewer instructions. Furthermore, various functions of mobile device 100 may be implemented in hardware and/or in software, including in one or more signal processing and/or application specific integrated circuits.

Downloading Application Program

Figure 4:
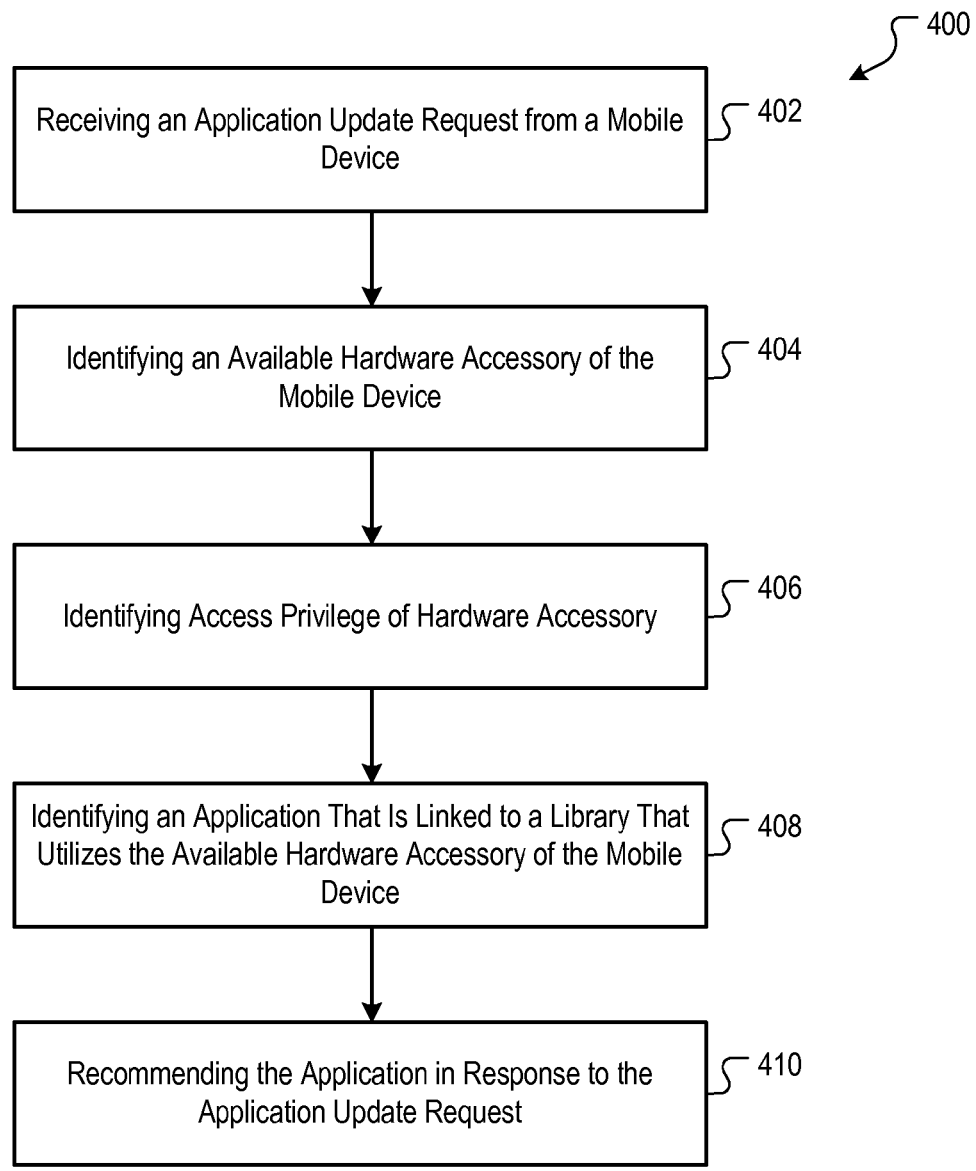
FIG. 4 is a flowchart illustrating an exemplary process for downloading to a mobile device application programs that are configured based on the hardware components of the mobile device.

FIG. 4 is a flowchart illustrating an exemplary process 400 for downloading to a mobile device application programs that are configured based on the hardware components of the mobile device. For convenience, process 400 is described with respect to server 130 that executes process 400.

In step 402, server 130 receives an application update request from a mobile device (e.g., mobile device 102). Mobile device 102 can send an application update request automatically (e.g., during mobile device boot up or initialization) or upon user request (e.g., when a user taps on an "Application Store" icon). An application update request can include an identification of the mobile device, a specification of the mobile device, and one or more licenses.

The identification of mobile device 102 can include a phone number, an International Mobile Equipment Identity ("IMEI") number, a serial number, an Integrated Circuit Card Identification ("ICCID") Number, a Media Access Control ("MAC") address, etc. The specification can include a mobile device type, a model number, an operating system name and version number, a modem firmware version number, language, country code, and names, types, and specifications of hardware components. The licenses can include service licenses that correspond to the service level subscribed by a user, licenses of the hardware components of the mobile device, and group licenses that can determine to which group the mobile device belongs. A group license can allow the mobile device to download application programs that are private to predefined groups. For example, a company can give a license to all company mobile devices such that a company mobile device can download the company's specific travel expense application programs, which are not accessible by general public.

In step 404, server 130 identifies an available hardware component of mobile device 102 based on the specification. For example, from the specification, server 130 can determine whether mobile device 102 has built-in components such as a cellular phone module, a GPS receiver, or a digital camera. The server can also determine whether the mobile device is connected to hardware accessories such as external microphone 103, an external digital camera, or an external antenna.

In step 406, server 130 identifies an access privilege of a hardware component based on the license. A license can be associated with a mobile device, a service level, a group, a country, or a hardware component of the mobile device. A hardware component license, together with the hardware component's specification, can be stored as firmware in the hardware component. Server 130 can also identify an access privilege of the mobile device based on a group license, a country code, or a subscribed service plan. Server 130 can use the access privilege to determine which application program can be downloaded onto the mobile device, and whether the download requires a fee.

In some implementations, server 130 can determine which application program can be downloaded onto the mobile device further based an age-ranking of the application program and a parental-control status of the mobile device. Parental-control mechanisms can be implemented to restrict access to certain application programs. Server 130 can associate each application programs with a label that specifies an appropriate age group (e.g., 4+, 9+, 12+, or 17+, etc.). In some implementations, application programs in each age group can be assigned a rank (e.g., a number between 0 and 1000). Server 130 can use the rank to enforce age restrictions by comparing the rank of a program application with a user-specified access level on the mobile device. For example, a parent can determine that application programs suitable for nine-year-old children can be downloaded to the mobile device. The parent can access a parental-control user interface to configure a specific access level of the mobile device to permit downloading of application programs labeled "9+." The parental-control user interface that permits a user to enter, modify, or delete the access level can be password protected.

In step 408, server 130 can identify an application program that is compatible with the identified available hardware component of the mobile device and the identified access privilege. An application program is compatible with the available hardware components if hardware requirements of the application is satisfied by the hardware components of mobile device 102. To determine the hardware requirement of the application, server 130 can examine the libraries that are linked to the application and the hardware require by the libraries. To determine whether the hardware requirement is satisfied, server 130 can compare the hardware requirement of the application with available hardware component send through the request 122 and determine whether the required hardware is present.

Further, an application program can be compatible with the available hardware components if the licenses on the mobile device have sufficient privileges to execute the application program. To determine whether the licenses on the mobile device have sufficient privileges to execute the application program, server 130 can compare the access privilege of a hardware component, a mobile device, or a service level to a license requirement of the application program. The access privilege of a hardware component can be determined based on license 104 in the update request 122. The license requirement of application programs can be stored in a license table on server 130.

In step 410, server 130 can recommend the application programs that are compatible with mobile device 102. Recommending the application programs can include displaying icons that are linked to the application programs as display objects on a display screen of the mobile device. The icons can be ordered according to the ranks of the application programs to which the icons are linked. The rank of an application program can be based on the relevance of the application program to the update request. Application programs that utilizes an external hardware accessory specified in the update request can rank higher than application programs that only use built-in hardware component. For example, for mobile device 102 that is connected to external microphone 103, an application program that utilizes audio capabilities can rank higher than an application program that utilizes built-in camera capabilities.

A user can select one or more application programs from the recommended applications to download by tapping on one or more icons displayed. Upon a user selection, the application can be downloaded from server 130 to mobile device 102 and stored on mobile device 102.

Identifying an Application

Figure 5:
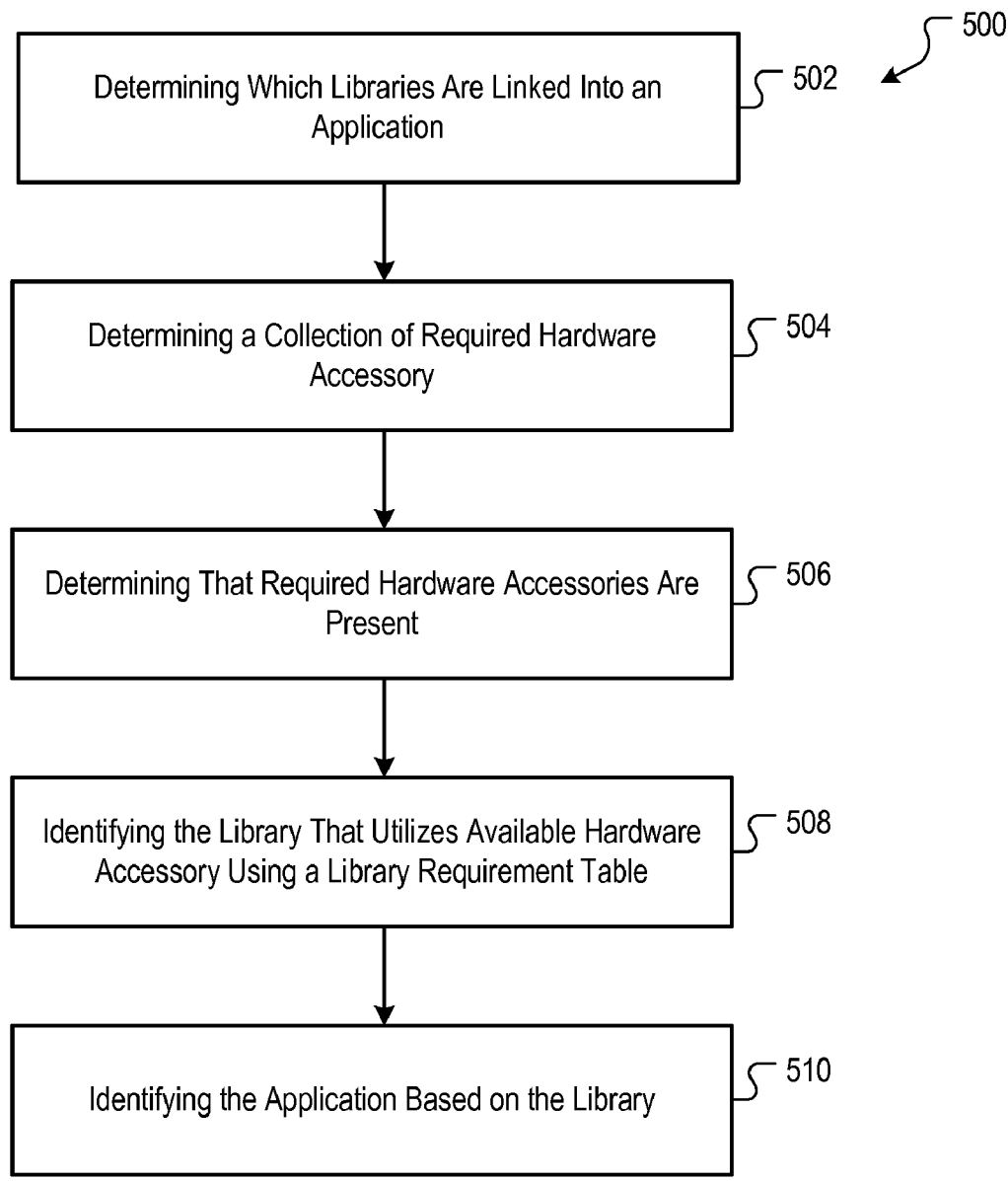
FIG. 5 is a flowchart illustrating an exemplary process for identifying an application that is linked to a library that utilizes the available hardware component of the mobile device.

FIG. 5 is a flowchart illustrating an exemplary process 500 for identifying an application that is linked to a library that utilizes the available hardware component of mobile device 102. For convenience, process 500 is described with respect to a server 130 that executes process 500. Process 500 in FIG. 5 can correspond to the identifying an application program that is compatible with the identified available component of mobile device 102 and the identified access privilege in FIG. 4.

If a user connects a particular hardware accessory to a mobile device, the user is likely to be more interested in application programs that use that hardware accessory than other application programs. Therefore, server 130 can identify application programs that use the hardware accessory in order to provide the user with a better download experience. Server 130 can identify application programs that use a hardware accessory by examining the libraries that are linked to the application programs.

In step 502, server 130 makes an identification on which libraries are linked to an application. A library is a collection of routines or classes used in software development. Libraries can contain code and data that provide services to an independent program. Different libraries can be built for different platforms, operating systems, or hardware. Libraries can allow code and data to be shared and changed in a modular fashion. Some example libraries for mobile device application programs are UI Kit and Audio Toolbox. Libraries linked to an application can be identified by public available tools or utility programs in operating systems. An example utility program for identifying libraries in an application program is ldd in UNIX environment. The identified libraries can be used to determine the hardware requirements of the application.

In step 504, server 130 determines what hardware is required to run the application on a mobile device 102. Server 130 can determine the hardware requirement by looking up hardware requirements of the linked libraries in a library requirement table. A library requirement table can contain libraries and the hardware that is required for each library. The hardware that is required for each library can be specified by the library developer. Table 1 is an example library requirement table.

TABLE 1

| Library | Hardware Requirement |
|---|---|
| UI Kit | Touch screen interface |
| | Accelerometer |
| Audio Toolbox | Microphone |
| | Speaker |
| Location Toolbox | GPS receiver |
| ... | ... |

For example, if an application is linked to libraries Audio Toolbox and Location Toolbox, the application requires a mobile device that has either built-in or external hardware microphone, speaker, and GPS receiver. If an application is not linked to any library, the application can be downloaded on any mobile device, which has a compatible operating system and proper license, regardless of hardware, unless the application contains device specific code (e.g., assembly code that directly talks to a hardware device).

In next step 506, server 130 determines that the required hardware components are available on the mobile device making the update request. Server 130 can make this determination by comparing the information on available hardware components in the specification with the required hardware.

In next step 508, server 130 identifies a library that is linked to the application that utilizes the available hardware component. In some implementations, if a particular application is linked to a library that utilizes an external hardware accessory that is currently connected to a mobile device, the user of the mobile device is likely to be more interested in the particular application than other applications. If a particular application is linked to a library that utilizes an internal hardware component that is unavailable (e.g., loudspeakers built into the mobile device but are disabled), the user is likely to be less interested in the particular application than other applications. Server 130 can determine whether an application is one in which a user is interested by examining whether a library used by the application requires the hardware component. In some implementations, server 130 can perform a reverse look up in the library requirement table to find libraries that use a particular hardware accessory. In some implementations, server 130 can examine the libraries that are linked into the application, and identify the libraries that use the available hardware component.

In next step 510, server 130 identifies the application as one that uses the available hardware component specified in a specification an update request 122 based on the library the application is linked to. For example, for mobile device 102 that is connected to external microphone 103, application programs that are linked to library "Audio Toolbox" can be identified; application programs that are only linked to libraries "UI Kit" and "Location Toolbox" are not.

Further, server 130 can determine whether the application is accessible by the mobile device based on the access privilege. Server 130 can determine whether an application is accessible by a mobile device having a particular hardware component by consulting a license table that is associated with the application program. In some implementations, the license table can be populated by an application developer (e.g., a developer can specify who can download the developer's applications).

Recommending Application Programs

Figure 6:
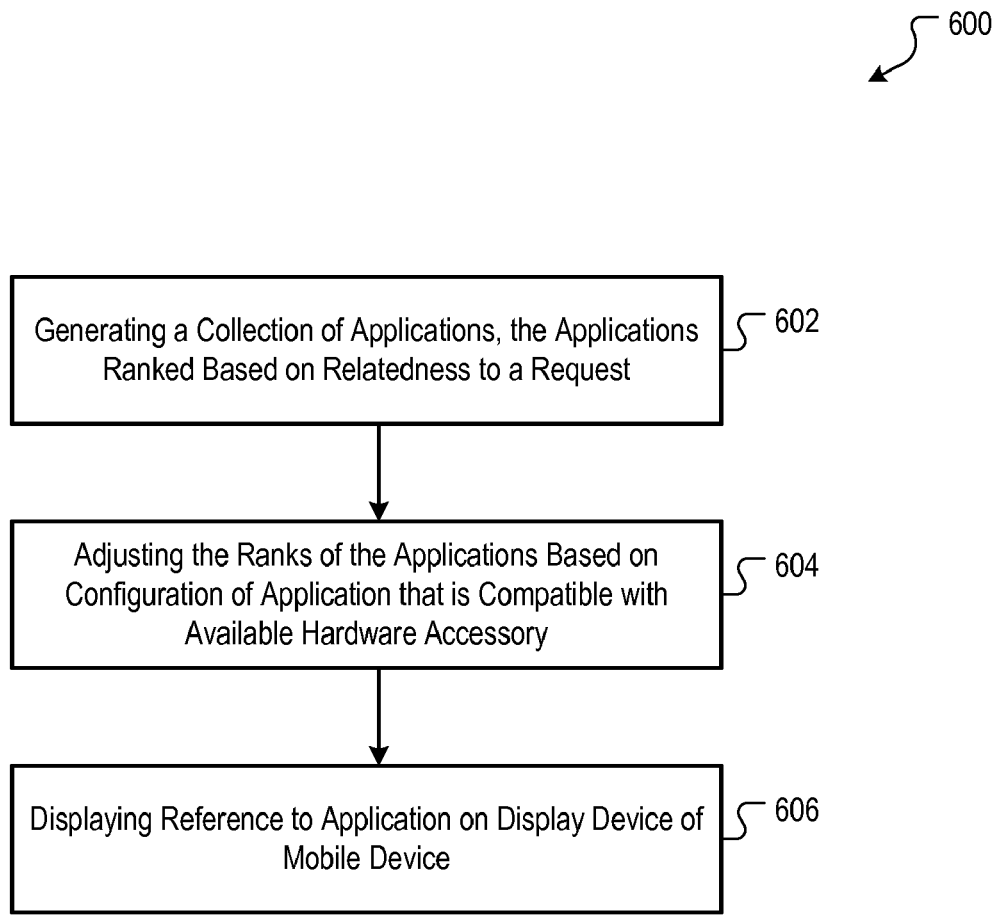
FIG. 6 is a flowchart illustrating an exemplary process for recommending hardware-specific application programs to a mobile device user.

FIG. 6 is a flowchart illustrating an exemplary process 600 for recommending hardware-specific application programs to a mobile device user. For convenience, process 600 is described with respect to server 130 that executes process 600. Process 600 in FIG. 6 can correspond to the recommending process described in reference to FIG. 4.

In step 602, server 130 generates a collection of applications. Each application in the collection can have a rank. The rank of an application can be based on a degree of relevance between the application in the collection and the update request. For example, the update request can be for "the top 25 most popular application programs" or "the featured applications." The update request can also include a search term (e.g., "dictionary"). Server 130 can select corresponding application programs based on the update request.

In next step 604, server 130 can adjust the ranks of the applications in the collection such that hardware-specific application programs rank higher. The application program that is linked to a library that utilizes the available hardware component of the mobile device can rank higher in the collection than other applications. For example, if a user's mobile device 102 has built-in loudspeakers 108i or is connected to external microphone 103, when the user searches for applications using search term "dictionary," a voice-enabled dictionary program that is linked to a library that has voice-recognition functions and can accept voice input from a microphone can be more relevant to the user. Therefore, the voice-enabled dictionary can be ranked higher than a dictionary having no voice capabilities. The higher rank can be determined based on the determination that the voice-input dictionary is linked to a library that uses a microphone (e.g., Audio Toolbox), whereas a non-voice dictionary is not linked to libraries that use microphones.

In a next step 608, server 130 sends a reference to at least one application in the collection to a mobile device (e.g., mobile device 102) for display, based on the rank of the at least one application. The reference can be an icon, or a label, or both. A mobile device can have a relatively small display screen compared to a desktop or laptop computer, and therefore, less capability to display long lists of recommendations. Therefore, an application having a rank near the top can have better chance to attract a user's attention.

In some implementations, server 130 can determine which reference to send to mobile device 102 further based on an age-ranking of the underlying application program and a parental-control access level of the mobile device. For example, references to applications labeled to be suitable for age group 17+ can be excluded if the parental-control access level of mobile device 102 is set to 9+.

In some implementations, server 130 can display all references regardless of the suitable age of the underlying applications. Parental-control can be enforced by restricting access to the underlying application program rather than restricting access to the references (e.g., icons). For example, server 130 can display the age label together with an application description that is displayed next to the reference icon. Access to application programs that are in inappropriate age groups can be disabled (e.g., the icon can be grayed out), such that a detailed display of the inappropriate application programs (e.g. images of the application programs including screenshots) and download links to these programs are hidden from a user.

Updating Application Programs

Figure 7:
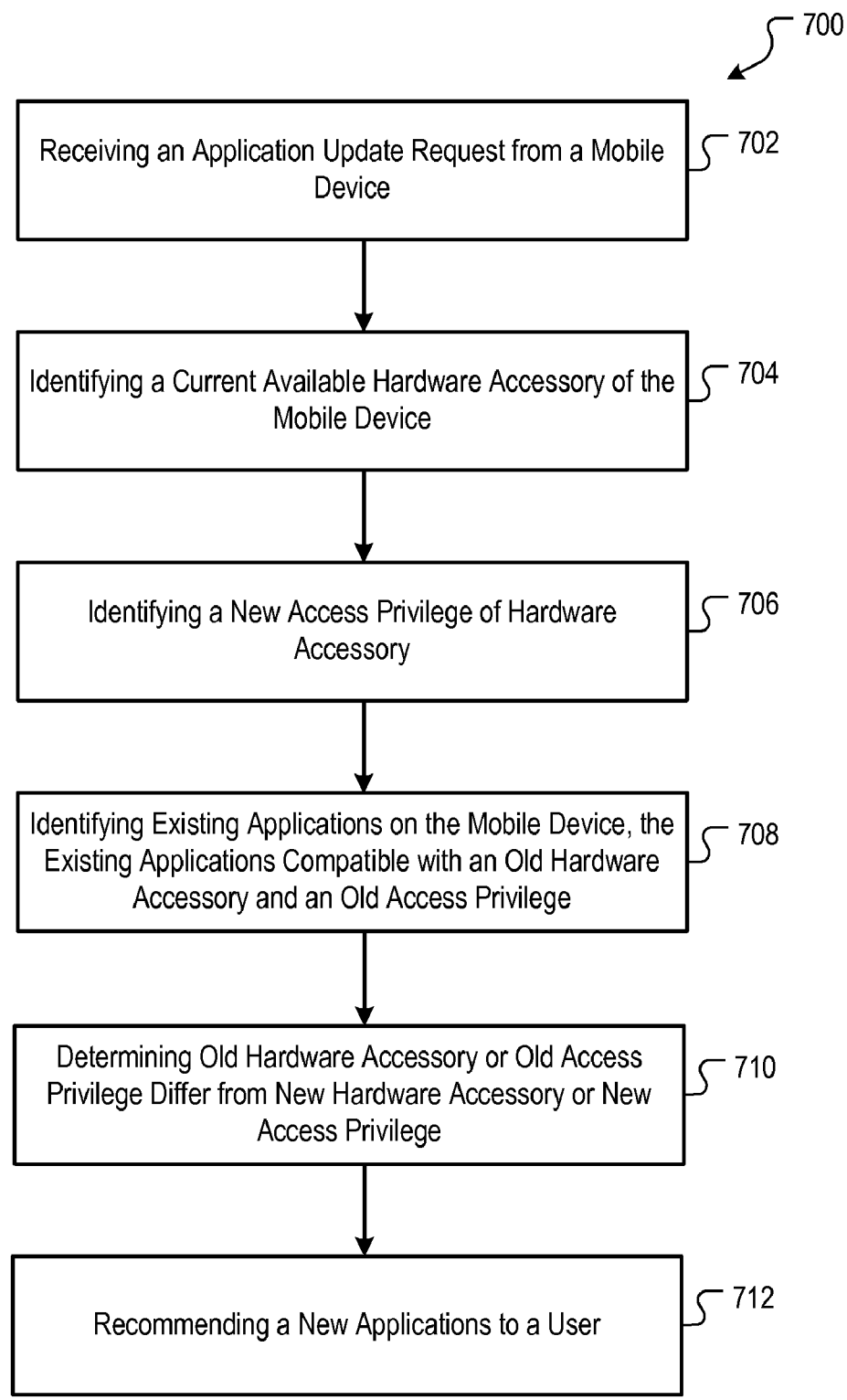
FIG. 7 is a flowchart illustrating an exemplary process for updating application programs that have been downloaded to a mobile device when available hardware components of the mobile device change.

FIG. 7 is a flowchart illustrating an exemplary process 700 for recommending application programs that have been downloaded to a mobile device when available hardware components of the mobile device change. For convenience, process 700 is described with respect to server 130 that executes process 700.

In step 702, server 130 receives an application update request from a mobile device. The application update request can include an identity of the mobile device, a current specification of the mobile device and a current license. The application update request can also include a request to update application programs already downloaded to the mobile device. The update request can be initiated by a user. The update request can also be triggered by server 130. For example, when a new version of an application program or operating system is available, server 130 can broadcast the availability of the updated version. A mobile device can send the update request in response to the broadcast.

In step 704, server 130 identifies a current available hardware component of the mobile device based on the specification that contains information on currently available hardware components and currently available hardware components.

In step 706, server 130 identifies a current access privilege of the hardware component based on the current license. The current license can be specific to a mobile device, a hardware component, a service level, or a group.

In step 708, server 130 identifies one or more existing applications on the mobile device that uses an old hardware component or an old license. In some implementations, update request 122 can include a listing of existing downloaded applications. The listing can include information on an available hardware component based on which an existing application was recommended, selected, and downloaded. In some implementations, server 130 can keep a record on a mobile device and applications downloaded to the mobile device based on an available hardware component.

In step 710, server 130 determines that the old hardware component or old access privilege differs from the current hardware component or current access privilege. For example, a silent dictionary program could have been downloaded when mobile device 102 did not have built-in microphone 108*d* and was not connected to external microphone 103. Currently, mobile device 102 is connected to external microphone 103. Based on the listing in the update request or the download record on server 130, server 130 can determine that the reason for downloading a non-voice version of the dictionary, that mobile device 102 cannot accept voice input, is no longer valid.

Server 130 can also identify a new application in which a user can be interested. The new application can have function similar to the existing application. However, the new application can be linked to a library that utilizes the currently available hardware component and be accessible under the current access privilege. A new application can have similar function to an existing application if, for example, the new application (e.g., eDictionary version 2.0) is a newer version of the existing application (e.g., eDictionary version 1.0), or when the new application is in the same category of the existing application. When external microphone 103 currently connected to mobile device 102, a new dictionary program that is capable of accepting voice input can be recommended. Server 130 can select a new application based on the hardware component and license using the techniques described above with respect to FIG. 4.

In step 712, server 130 recommends the new applications in response to the application update request. Recommending the new applications can include displaying icons of the new applications on the mobile device. Upon a user selection, the user can download the new application. In some implementations, the new application replaces the existing application on the mobile device (e.g., when a the new application is a newer version of the old application). In some implementations, the new application is stored on the mobile device together with the old application.

Network Operating Environment

Figure 8:
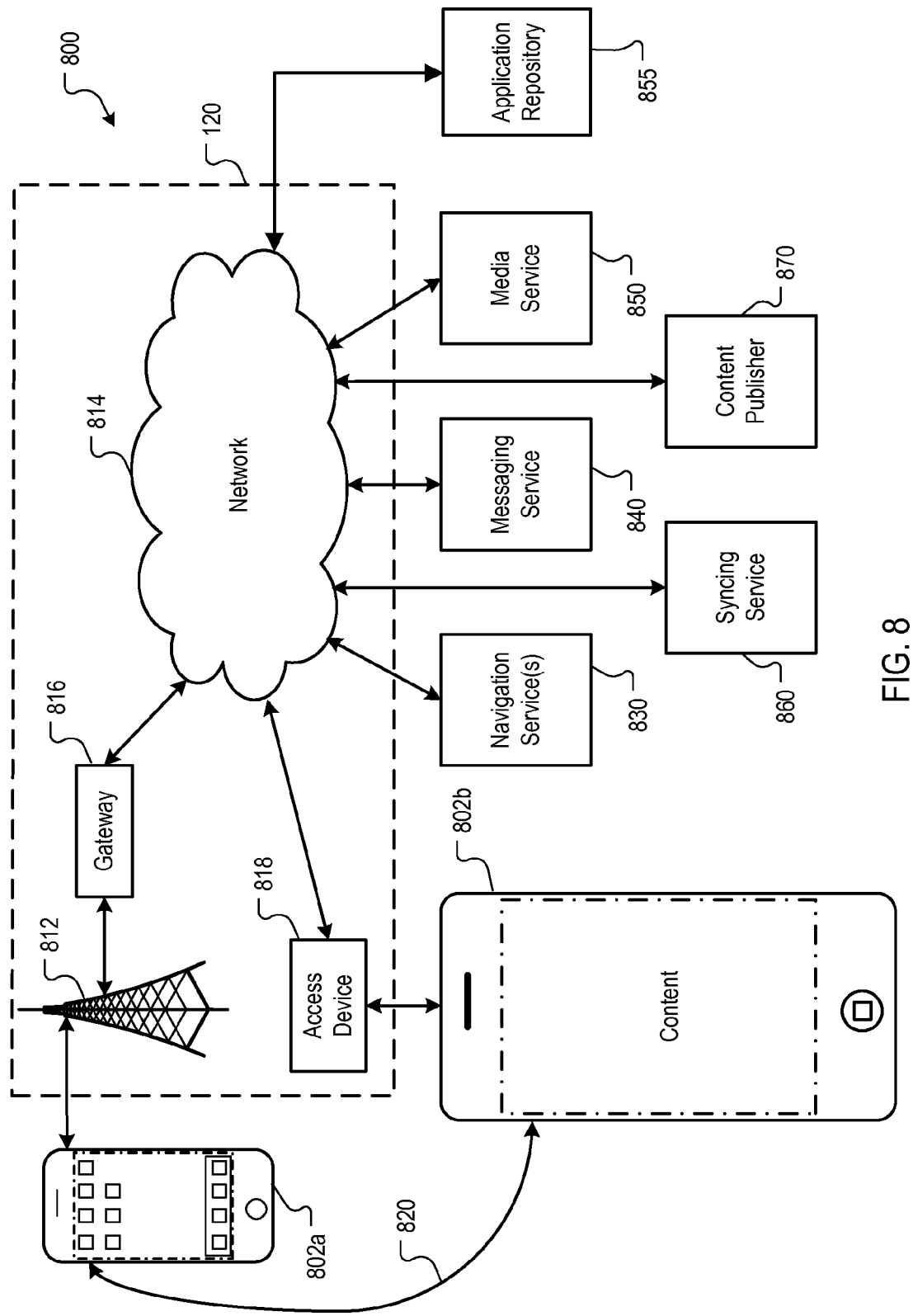
FIG. 8 is a block diagram of an exemplary network operating environment for a mobile device.

FIG. 8 is a block diagram of an exemplary network operating environment 800 for a mobile device. Mobile device 102 of FIG. 1 can correspond to mobile device 802*a* or 802*b* in the exemplary network operating environment 800. Mobile devices 802*a* or 802*b* can communicate over one or more wired and/or wireless networks 120 in data communication. For example, wireless network 812, e.g., a cellular network, can communicate with wide area network (WAN) 814, such as the Internet, by use of gateway 816. Likewise, access point device 818, such as an 802.11g wireless access point device, can provide communication access to wide area network 814. In some implementations, both voice and data communications can be established over wireless network 812 and access point device 818. For example, mobile device 802*a* can place and receive phone calls (e.g., using VoIP protocols), send and receive e-mail messages (e.g., using POP3 protocol), and retrieve electronic documents and/or streams, such as web pages, photographs, and videos, over the wireless network 812, gateway 816, and wide area network 814 (e.g., using TCP/IP or UDP protocols). Likewise, mobile device 802*b* can place and receive phone calls, send and receive e-mail messages, and retrieve electronic documents over access point device 818 and wide area network 814. In some implementations, mobile device 802*b* can be physically connected to access point device 818 using one or more cables and access point device 818 can be a personal computer. In this configuration, mobile device 802*b* can be referred to as a "tethered" device.

Mobile devices 802*a* and 802*b* can also establish communications by other means. For example, wireless device 802*a* can communicate with other wireless devices, e.g., other wireless devices 802, cell phones, etc., over the wireless network 812. Likewise, mobile devices 802*a* and 802*b* can establish peer-to-peer communications 820, e.g., in a personal area network, by use of one or more communication subsystems, such as a Bluetooth™ communication device. Other communication protocols and topologies can also be implemented.

Mobile device 802 can, for example, communicate with one or more services 830, 840, 850, 855, and 860 and/or one or more content publishers 870 over the one or more wired and/or wireless networks 120. For example, navigation service 830 can provide navigation information, e.g., map information, location information, route information, and other information, to mobile device 802. In the example shown, a user of mobile device 802*b* can invoke a map functionality, e.g., by pressing maps object 230 on the top-level graphical user interface shown in FIG. 2B, and can request and receive a map for a location "100 NE Center Street, Peoria, Ill."

Messaging service 840 can, for example, provide e-mail and/or other messaging services. Media service 850 can, for example, provide access to media files, such as song files, movie files, video clips, and other media data. An application repository can, for example, store a repository of application programs and recommend the application programs for downloads. One or more other services 860 can also be utilized by mobile device 802.

Mobile device 802 can also access other data and content over the one or more wired and/or wireless networks 120. For example, content publishers 870, such as news sites, RSS feeds, web sites, blogs, social networking sites, developer networks, etc., can be accessed by mobile device 802. Such access can be provided by invocation of a web browsing function or application (e.g., a browser) in response to a user touching the Web object 210.

The systems and methods disclosed herein may use data signals conveyed using networks (e.g., local area network, wide area network, internet, etc.), fiber optic medium, carrier waves, wireless networks (e.g., wireless local area networks, wireless metropolitan area networks, cellular networks, etc.), etc. for communication with one or more data processing devices (e.g., mobile devices). The data signals can carry any or all of the data disclosed herein that is provided to or from a device.

The methods and systems described herein may be implemented on many different types of processing devices by program code comprising program instructions that are executable by one or more processors. The software program instructions may include source code, object code, machine code, or any other stored data that is operable to cause a processing system to perform methods described herein.

The systems and methods may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. It is also noted that software instructions or a module can be implemented for example as a subroutine unit of code, or as a software function unit of code, or as an object (as in an object-oriented paradigm), or as an applet, or in a computer script language, or as another type of computer code or firmware. The software components and/or functionality may be located on a single device or distributed across multiple devices depending upon the situation at hand.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

These and other implementations are within the scope of the following claims.

The invention claimed is:

1. A computer-implemented method comprising:
    receiving an application update request from a mobile device, the request comprising a specification of the mobile device and a license;
    identifying an available hardware component of the mobile device based on the specification;
    identifying an access privilege of the hardware component based on the license;
    identifying an application that utilizes the available hardware component of the mobile device and is accessible under the identified access privilege; and
    recommending the application in response to the application update request.

2. The method of claim 1, where identifying the application comprises:
    identifying libraries to which the application is linked;
    from the identified libraries, identifying a library using a library requirement table, the library utilizes the available hardware component; and
    identifying the application based on the library.

3. The method of claim 1, where recommending the application to a user comprises:
    generating a collection of applications, each application in the collection having a rank, the rank based on a degree of relevance between the application in the collection and the update request;
    adjusting the ranks of the applications in the collection such that the application that utilizes the available hardware component of the mobile device ranks higher in the collection than other applications; and
    displaying a reference to at least one application in the collection on a display screen of the mobile device based on the rank of the at least one application.

4. The method of claim 1, where the specification of the mobile device includes information on the available hardware component, where the information is updated when an additional hardware component is connected to the mobile device or when the available hardware component is disconnected from the mobile device.

5. The method of claim 1, where the license is associated with the hardware component and stored as firmware in the hardware component.

6. The method of claim 1, where the license determines the access privilege of the hardware component, the access privilege permitting the one or more applications to be executed on the mobile device when the hardware component is connected to the mobile device.

7. A computer-implemented method comprising:
    receiving an application update request from a mobile device, the request comprising specification of the mobile device and a first license;
    identifying a first available hardware component of the mobile device based on the specification;
    identifying a first access privilege of the hardware component based on the license;
    identifying an existing application on the mobile device, the existing application compatible with a second available hardware component of the mobile device and a second access privilege;
    determining that the first available hardware component is not identical to the second available hardware component; and
    recommending a new application, the new application replacing the existing application, where the new application is linked to a library that utilizes the first available hardware component and accessible under the first access privilege.

8. A non-transitory computer-readable medium storing a computer program which, when executed by a computer processor, causes the computer processor to perform operations comprising:
    receiving an application update request from a mobile device, the request comprising a specification of the mobile device and a license;
    identifying an available hardware component of the mobile device based on the specification;
    identifying an access privilege of the hardware component based on the license;

identifying an application that utilizes the available hardware component of the mobile device and is accessible under the identified access privilege; and recommending the application in response to the application update request.

9. The non-transitory computer-readable medium of claim 8, where identifying the application comprises:
identifying libraries to which the application is linked;
from the identified libraries, identifying a library using a library requirement table, the library utilizes the available hardware component; and
identifying the application based on the library.

10. The non-transitory computer-readable medium of claim 8, where recommending the application to a user comprises:
generating a collection of applications, each application in the collection having a rank, the rank based on a degree of relevance between the application in the collection and the update request;
adjusting the ranks of the applications in the collection such that the application that utilizes the available hardware component of the mobile device ranks higher in the collection than other applications; and
displaying a reference to at least one application in the collection on a display screen of the mobile device based on the rank of the at least one application.

11. The non-transitory computer-readable medium of claim 8, where the specification of the mobile device includes information on the available hardware component, where the information is updated when an additional hardware component is connected to the mobile device or when the available hardware component is disconnected from the mobile device.

12. The non-transitory computer-readable medium of claim 8, where the license is associated with the hardware component and stored as firmware in the hardware component.

13. The non-transitory computer-readable medium of claim 8, where the license determines the access privilege of the hardware component, the access privilege permitting the one or more applications to be executed on the mobile device when the hardware component is connected to the mobile device.

14. A non-transitory computer-readable medium storing a computer program which, when executed by a computer processor, causes the computer processor to perform operations comprising:
receiving an application update request from a mobile device, the request comprising a specification of the mobile device and a first license;
identifying a first available hardware component of the mobile device based on the specification;
identifying a first access privilege of the hardware component based on the license;
identifying an existing application on the mobile device, the existing application compatible with a second available hardware component of the mobile device and a second access privilege;
determining that the first available hardware component is not identical to the second available hardware component; and
recommending a new application, the new application replacing the existing application, where the new application is linked to a library that utilizes the first available hardware component and accessible under the first access privilege.

15. A system comprising:
a processor; and
memory coupled to the processor and operable for storing instructions, which, when executed by the processor, causes the processor to perform operations comprising:
receiving an application update request from a mobile device, the request comprising a specification of the mobile device and a license;
identifying an available hardware component of the mobile device based on the specification;
identifying an access privilege of the hardware component based on the license;
identifying an application that utilizes the available hardware component of the mobile device and is accessible under the identified access privilege; and
recommending the application in response to the application update request.

16. The system of claim 15, where identifying the application comprises:
identifying libraries to which the application is linked;
from the identified libraries, identifying a library using a library requirement table, the library utilizes the available hardware component; and
identifying the application based on the library.

17. The system of claim 15, where recommending the application to a user comprises:
generating a collection of applications, each application in the collection having a rank, the rank based on a degree of relevance between the application in the collection and the update request;
adjusting the ranks of the applications in the collection such that the application that utilizes the available hardware component of the mobile device ranks higher in the collection than other applications; and
displaying a reference to at least one application in the collection on a display screen of the mobile device based on the rank of the at least one application.

18. The system of claim 15, where the specification of the mobile device includes information on the available hardware component, where the information is updated when an additional hardware component is connected to the mobile device or when the available hardware component is disconnected from the mobile device.

19. The system of claim 15, where the license is associated with the hardware component and stored as firmware in the hardware component.

20. The system of claim 15, where the license determines the access privilege of the hardware component, the access privilege permitting the one or more applications to be executed on the mobile device when the hardware component is connected to the mobile device.

21. A system comprising:
a processor; and
memory coupled to the processor and operable for storing instructions, which, when executed by the processor, causes the processor to perform operations comprising:
receiving an application update request from a mobile device, the request comprising a specification of the mobile device and a first license;
identifying a first available hardware component of the mobile device based on the specification;
identifying a first access privilege of the hardware component based on the license;
identifying an existing application on the mobile device, the existing application compatible with a second available hardware component of the mobile device and a second access privilege;

determining that the first available hardware component is not identical to the second available hardware component; and recommending a new application, the new application replacing the existing application, where the new application is linked to a library that utilizes the first available hardware component and accessible under the first access privilege.

22. The method of claim 7, where identifying the application comprises:
   identifying libraries to which the application is linked;
   from the identified libraries, identifying a library using a library requirement table, the library utilizes the available hardware component; and
   identifying the application based on the library.

23. The method of claim 7, where recommending the new application comprises:
   generating a collection of applications, each application in the collection having a rank, the rank based on a degree of relevance between the application in the collection and the update request;
   adjusting the ranks of the applications in the collection such that the application that utilizes the available hardware component of the mobile device ranks higher in the collection than other applications; and
   displaying a reference to at least one application in the collection on a display screen of the mobile device based on the rank of the at least one application.

24. The non-transitory computer-readable medium of claim 14, where identifying the application comprises:
   identifying libraries to which the application is linked;
   from the identified libraries, identifying a library using a library requirement table, the library utilizes the available hardware component; and
   identifying the application based on the library.

25. The non-transitory computer-readable medium of claim 14, where recommending the new application comprises:
   generating a collection of applications, each application in the collection having a rank, the rank based on a degree of relevance between the application in the collection and the update request;
   adjusting the ranks of the applications in the collection such that the application that utilizes the available hardware component of the mobile device ranks higher in the collection than other applications; and
   displaying a reference to at least one application in the collection on a display screen of the mobile device based on the rank of the at least one application.

26. The system of claim 21, where identifying the application comprises:
   identifying libraries to which the application is linked;
   from the identified libraries, identifying a library using a library requirement table, the library utilizes the available hardware component; and
   identifying the application based on the library.

27. The system of claim 21, where recommending the new application comprises:
   generating a collection of applications, each application in the collection having a rank, the rank based on a degree of relevance between the application in the collection and the update request;
   adjusting the ranks of the applications in the collection such that the application that utilizes the available hardware component of the mobile device ranks higher in the collection than other applications; and
   displaying a reference to at least one application in the collection on a display screen of the mobile device based on the rank of the at least one application.

* * * * *